United States Patent
Chang et al.

(10) Patent No.: US 9,417,749 B2
(45) Date of Patent: Aug. 16, 2016

(54) SLEW RATE AND SHUNTING CONTROL SEPARATION

(71) Applicant: Apple Inc., Cupertino, CA (US)

(72) Inventors: Shih Chang Chang, Cupertino, CA (US); Hopil Bae, Sunnyvale, CA (US); Cheng-ho Yu, Cupertino, CA (US); Ahmad Al-Dahle, Santa Clara, CA (US); Abbas Jamshidi-Roudbari, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/929,120

(22) Filed: Oct. 30, 2015

(65) Prior Publication Data

US 2016/0054834 A1    Feb. 25, 2016

Related U.S. Application Data

(63) Continuation of application No. 12/976,909, filed on Dec. 22, 2010.

(51) Int. Cl.
G06F 3/044 (2006.01)
G06F 3/041 (2006.01)
G06F 3/045 (2006.01)

(52) U.S. Cl.
CPC ............ *G06F 3/044* (2013.01); *G06F 3/045* (2013.01); *G06F 3/0412* (2013.01); *G06F 3/0416* (2013.01)

(58) Field of Classification Search
CPC . G09G 3/3241; G09G 3/3266; G09G 3/3671; G09G 2310/0267
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |

(Continued)

FOREIGN PATENT DOCUMENTS

| | | |
|---|---|---|
| JP | 2000-163031 A | 6/2000 |
| JP | 2002-342033 A | 11/2002 |
| KR | 2001-0062920 A | 7/2001 |

OTHER PUBLICATIONS

Notice of Allowance mailed Feb. 2, 2016, for U.S. Appl. No. 13/112,862, filed May 20, 2011, five pages.

(Continued)

*Primary Examiner* — Carolyn R Edwards
(74) *Attorney, Agent, or Firm* — Morrison & Foerster LLP

(57) ABSTRACT

Setting a slew rate, e.g., a rising time or a falling time, of a scanning signal can be performed with a first operation, and a shunting resistance of the scanning line can be set with a second operation. A scanning system that scans a display screen, a touch screen, etc., can set a desired slew rate during a first period of time and can set a desired shunting resistance during a second period of time. A gate line system can sequentially scan gate lines to display an image during a display phase of a touch screen. The gate line system can, for example, increase the falling times of gate line signals. After the falling gate line signal has stabilized, for example, the gate line system can decrease the shunting resistance of the gate line.

20 Claims, 16 Drawing Sheets

(56) References Cited

U.S. PATENT DOCUMENTS

| | | | |
|---|---|---|---|
| 6,323,846 | B1 | 11/2001 | Westerman et al. |
| 6,573,777 | B2 | 6/2003 | Saint-Laurent et al. |
| 6,630,717 | B2 | 10/2003 | Ashida |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,561,137 | B2 | 7/2009 | Fratti et al. |
| 7,663,607 | B2 | 2/2010 | Hotelling et al. |
| 7,795,922 | B2 | 9/2010 | Tomoeda et al. |
| 7,804,553 | B2 | 9/2010 | Chang |
| 7,859,707 | B2 | 12/2010 | Kuwano et al. |
| 8,479,122 | B2 | 7/2013 | Hotelling et al. |
| 2002/0113767 | A1* | 8/2002 | Lin .................. G09G 3/2011 345/98 |
| 2002/0196057 | A1* | 12/2002 | Hidaka ............ H03K 19/00361 327/108 |
| 2003/0164722 | A1* | 9/2003 | Ajit ................. H03K 19/00384 327/108 |
| 2005/0083292 | A1 | 4/2005 | Moon et al. |
| 2006/0197753 | A1 | 9/2006 | Hotelling |
| 2006/0279511 | A1 | 12/2006 | Uh et al. |
| 2008/0067528 | A1 | 3/2008 | Choi et al. |
| 2008/0122511 | A1* | 5/2008 | Mei .................. H03K 19/017 327/170 |
| 2009/0168549 | A1* | 7/2009 | Jeon ..................... G11C 7/02 365/189.05 |
| 2010/0309190 | A1 | 12/2010 | Hasegawa et al. |
| 2011/0199365 | A1 | 8/2011 | Umezaki et al. |
| 2011/0267112 | A1* | 11/2011 | Lee ................ H03K 19/018528 327/108 |
| 2012/0162121 | A1 | 6/2012 | Chang |
| 2012/0293485 | A1* | 11/2012 | Chang ................. H03K 5/12 345/213 |
| 2013/0163312 | A1* | 6/2013 | Chang ................. G11C 11/413 365/156 |
| 2014/0091998 | A1* | 4/2014 | Ko .................... G09G 3/3674 345/100 |

OTHER PUBLICATIONS

Final Office Action mailed Sep. 24, 2013, filed May 20, 2011, for U.S. Appl. No. 13/112,862, 12 pages.
Final Office Action mailed Feb. 27, 2014, for U.S. Appl. No. 12/976,909, filed Dec. 22, 2010, 11 pages.
Final Office Action mailed Oct. 14, 2014, filed May 20, 2011, for U.S. Appl. No. 13/112,862, 11 pages.
Final Office Action mailed Nov. 26, 2014, for U.S. Appl. No. 12/976,909, filed Dec. 22, 2010, 16 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Mar. 1, 2013, filed May 20, 2011, for U.S. Appl. No. 13/112,862, 12 pages.
Non-Final Office Action mailed Oct. 11, 2013, for U.S. Appl. No. 12/976,909, filed Dec. 22, 2010, 10 pages.
Non-Final Office Action mailed Feb. 24, 2014, for U.S. Appl. No. 13/112,862, filed May 20, 2011, 14 pages.
Non-Final Office Action mailed Jun. 16, 2014, for U.S. Appl. No. 12/976,909, filed Dec. 22, 2010, 18 pages.
Non-Final Office Action mailed May 28, 2015, for U.S. Appl. No. 13/112,862, filed May 20, 2011, 13 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

SLEW RATE AND SHUNTING CONTROL SEPARATION

CROSS-REFERENCE TO RELATED APPLICATIONS

This application is a continuation of U.S. patent application Ser. No. 12/976,909, filed Dec. 22, 2010, and published as 2012-0162121 on Jun. 28, 2012, the disclosure of which is herein incorporated by reference in its entirety for all purposes.

FIELD OF THE DISCLOSURE

This relates generally to touch screens, and more particularly to systems and methods of separately controlling a slew rate of a scanning signal and a shunting capability of the scanning line.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY

The following description includes examples of systems and methods in which a slew rate, e.g., a rising time or a falling time, of a scanning signal can be set with a first operation, and a shunting resistance of the scanning line can be set with a second operation. In some embodiments, a scanning system that scans a display screen, a touch screen, etc., can set a desired slew rate during a first period of time and can set a desired shunting resistance during a second period of time. In some embodiments, a gate line system can sequentially scan gate lines to display an image during a display phase of a touch screen. The gate line system can, for example, increase the falling times of gate line signals to reduce or eliminate certain visual artifacts that can be caused by short falling times. After the falling gate line signal has stabilized, for example, the gate line system can decrease the shunting resistance of the gate line to reduce or eliminate other visual artifacts that can be caused by high shunting resistance of the gate line.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of systems and methods in which a slew rate, e.g., a rising time or a falling time, of a scanning signal can be set with a first operation, and a shunting resistance of the scanning line can be set with a second operation. In some embodiments, a scanning system that scans a display screen, a touch screen, etc., can set a desired slew rate during a first period of time and can set a desired shunting resistance during a second period of time. In some embodiments, a gate line system can sequentially scan gate lines to display an image during a display phase of a touch screen. The gate line system can, for example, increase the falling times of gate line signals to reduce or eliminate certain visual artifacts that can be caused by short falling times. After the falling gate line signal has stabilized, for example, the gate line system can decrease the shunting resistance of the gate line to reduce or eliminate other visual artifacts that can be caused by high shunting resistance of the gate line.

Figure 6:
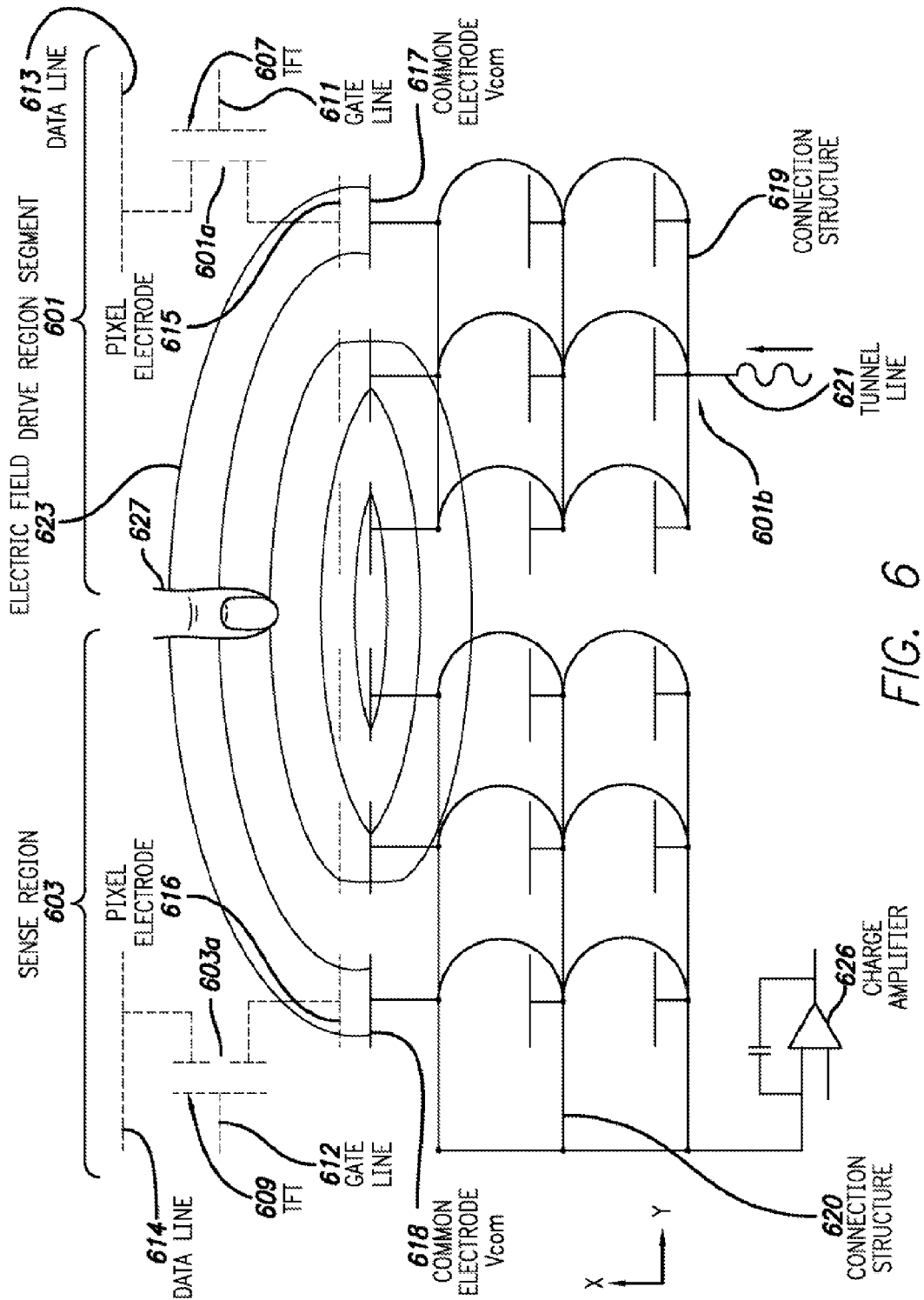
FIG. 6 illustrates an example touch sensing operation according to embodiments of the disclosure.
Figure 7:
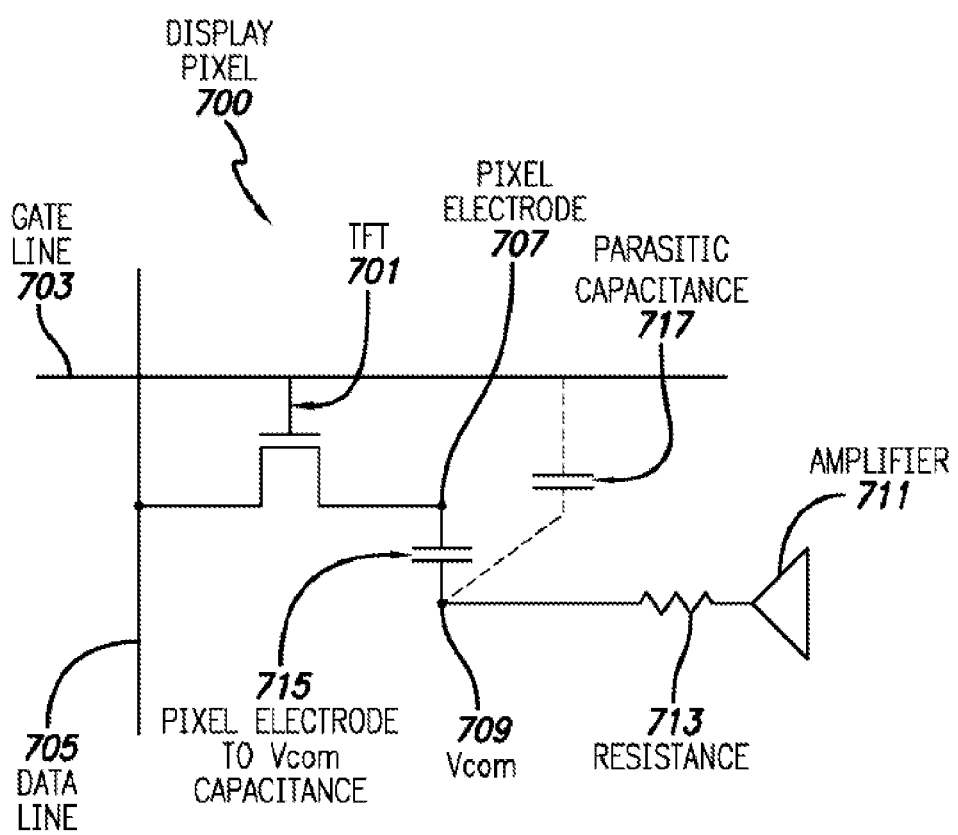
FIG. 7 illustrates a partial circuit diagram of an example display pixel according to embodiments of the disclosure.
Figure 8:
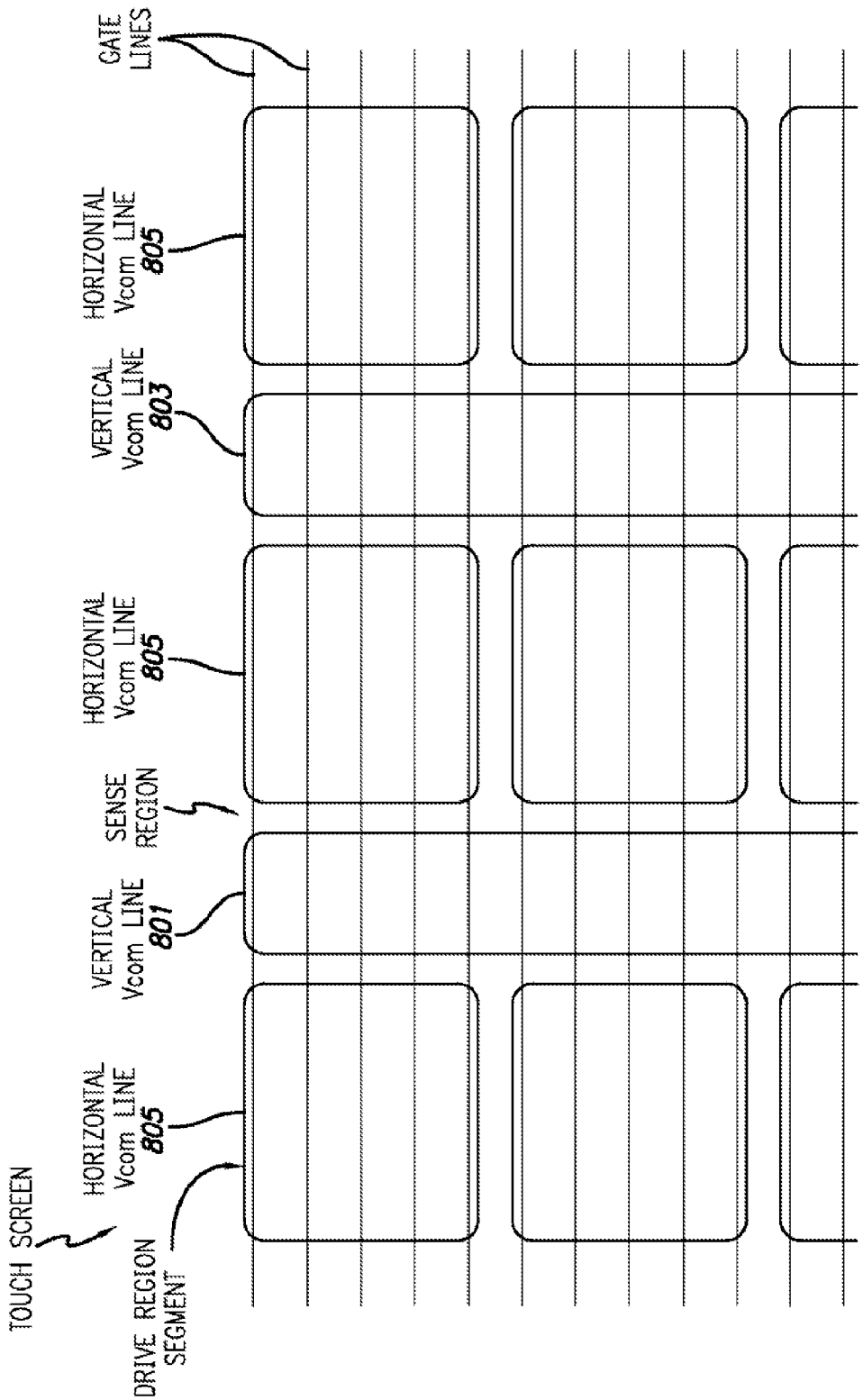
FIG. 8 illustrates an example configuration of horizontal and vertical Vcom lines according to embodiments of the disclosure.
Figure 9:
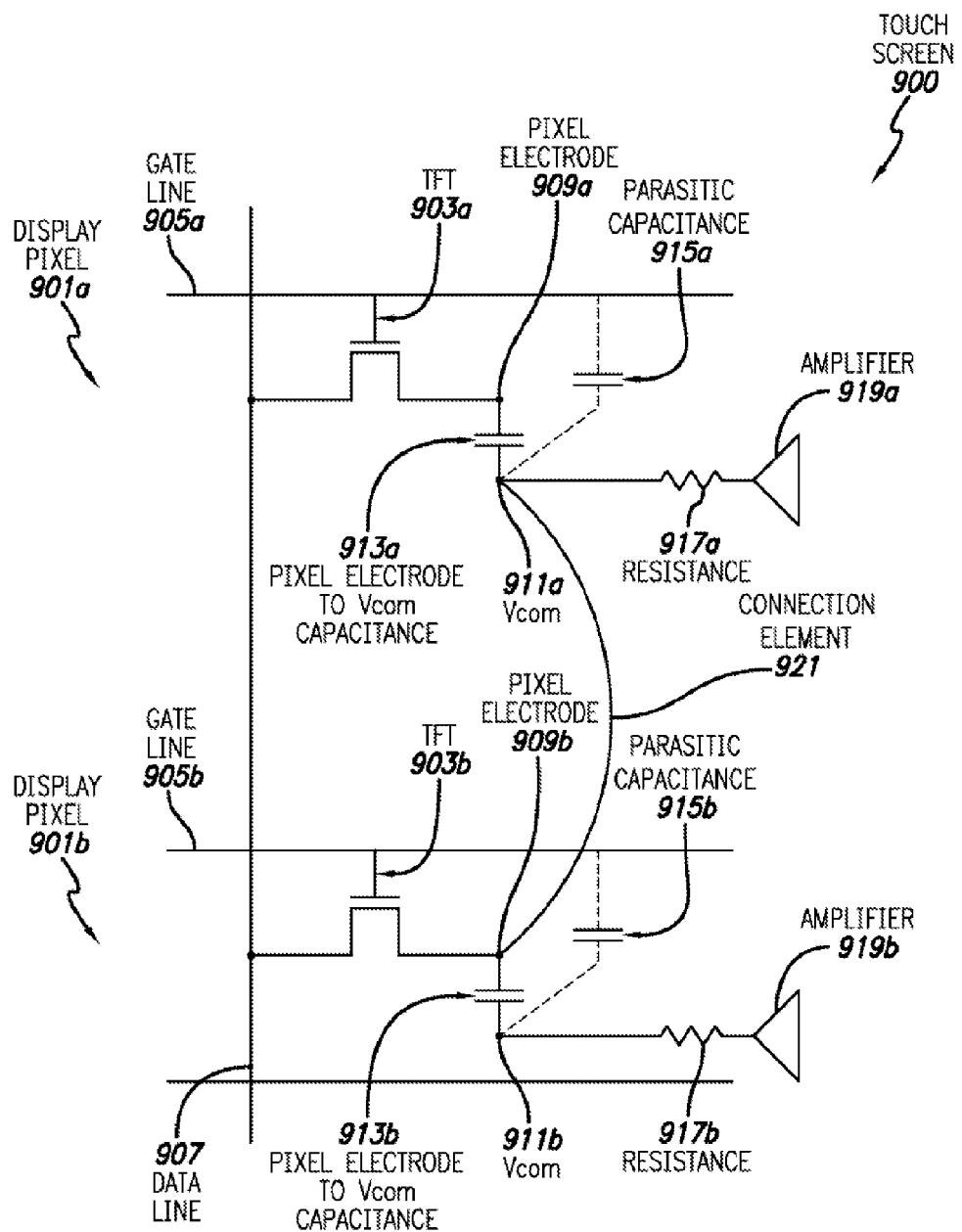
FIG. 9 illustrates a partial circuit diagram of example display pixels according to embodiments of the disclosure.

Example systems and methods can be utilized in many types of scanning systems, and can be particularly useful in systems that implement CMOS transistors to control the application of the scanning signals to scan lines. Separate control of scanning signal slew rate and scan line shunting resistance can be useful in some integrated touch screen systems. FIGS. 1A-1C and 2 illustrate some example systems in which touch screens, including integrated touch screens, can be implemented. FIGS. 3-6 illustrate some example structures and operations of example integrated touch screens. FIGS. 7-9 illustrate some potential errors, such as visual artifacts, that can occur in some integrated touch screens. FIGS. 10-15 illustrate example embodiments of systems and methods that can set a slew rate of a scanning signal with a first operation, and can set a shunting resistance of the scanning line with a second operation. In this way, for example, some visual artifacts can be reduced or eliminated by adjusting the slew rate of a scanning signal, and other visual artifacts can be reduced or eliminated by adjusting the shunting resistances of the scan lines.

Figure 1C:
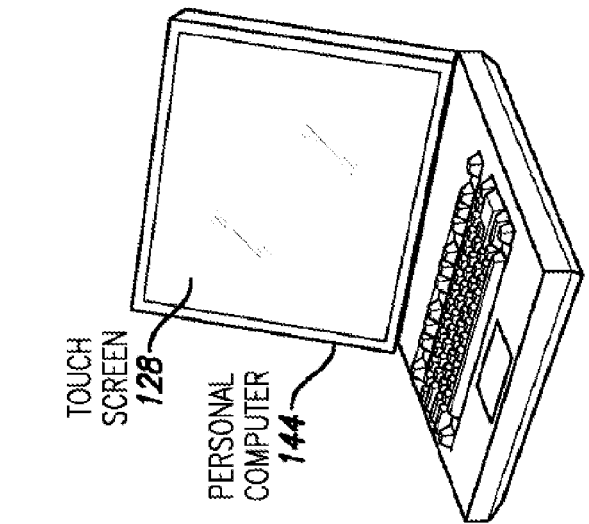
FIGS. 1A-1C illustrate an example mobile telephone, an example media player, and an example personal computer that each include an example touch screen according to embodiments of the disclosure.
Figure 1B:
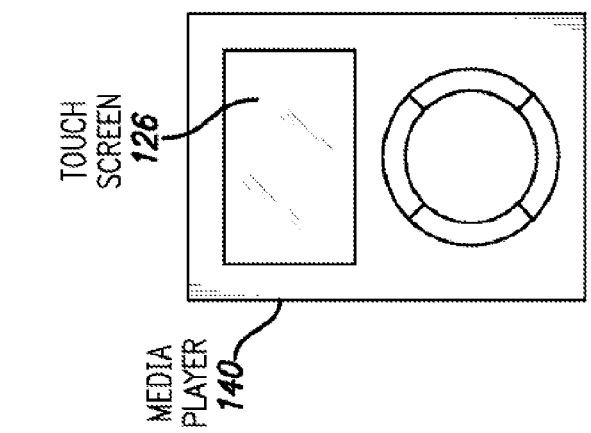
Figure 1A:
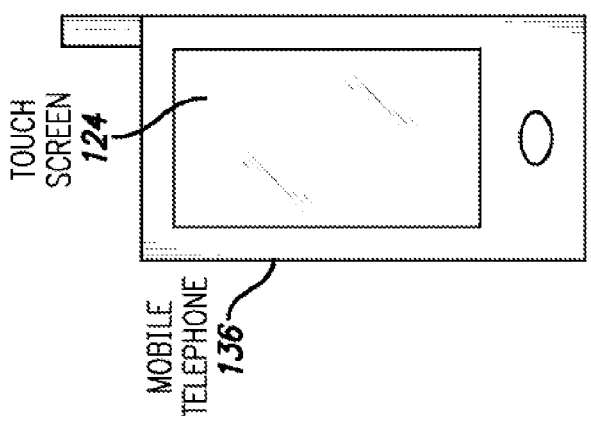

FIGS. 1A-1C show example systems in which a touch screen according to embodiments of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Touch screens 124, 126, and 128 may be based on, for example, self capacitance or mutual capacitance, or another touch sensing technology in which effects of parasitic capacitances can be equalized. For example, in a self capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, or any capacitive touch.

Figure 2:
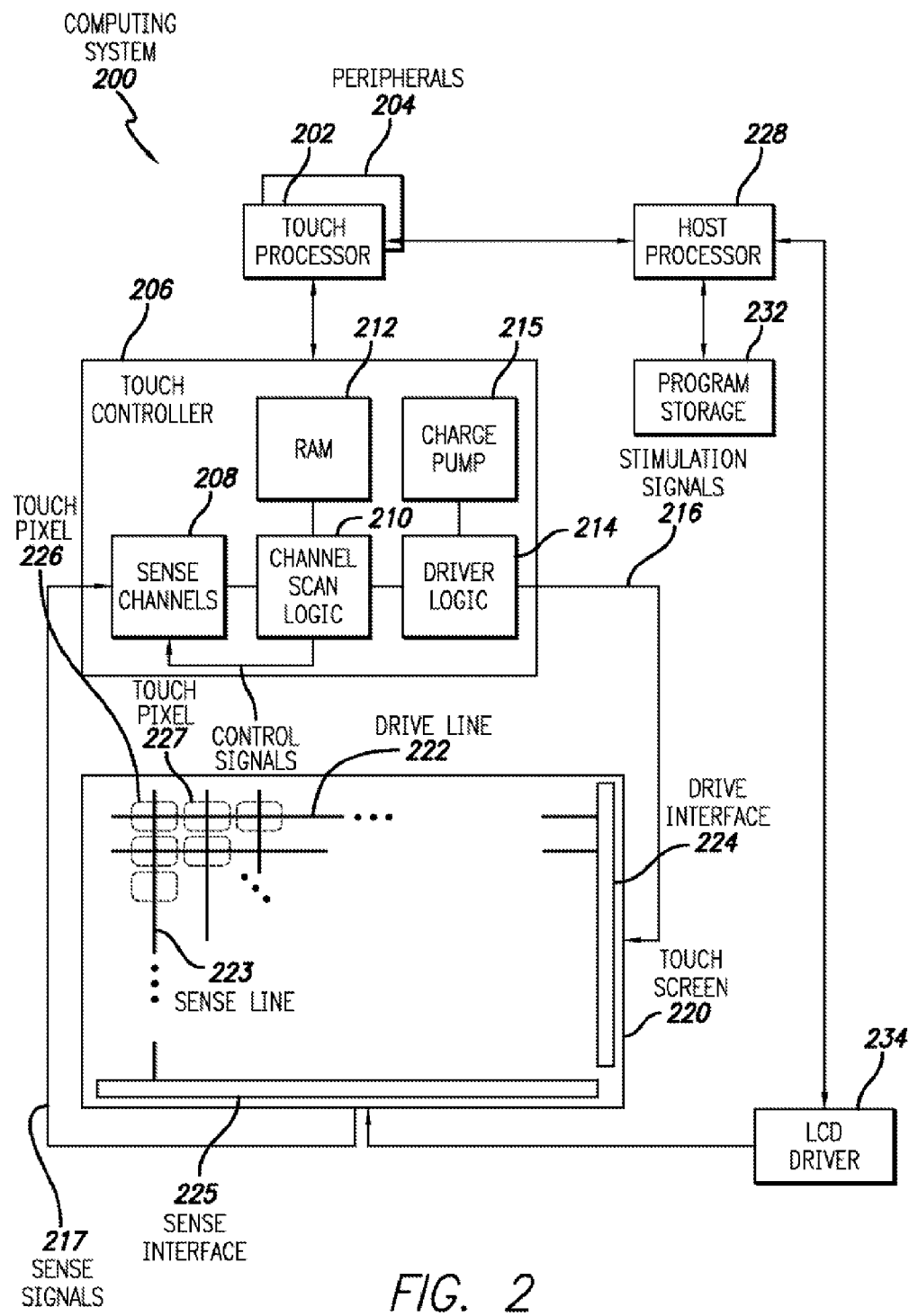
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
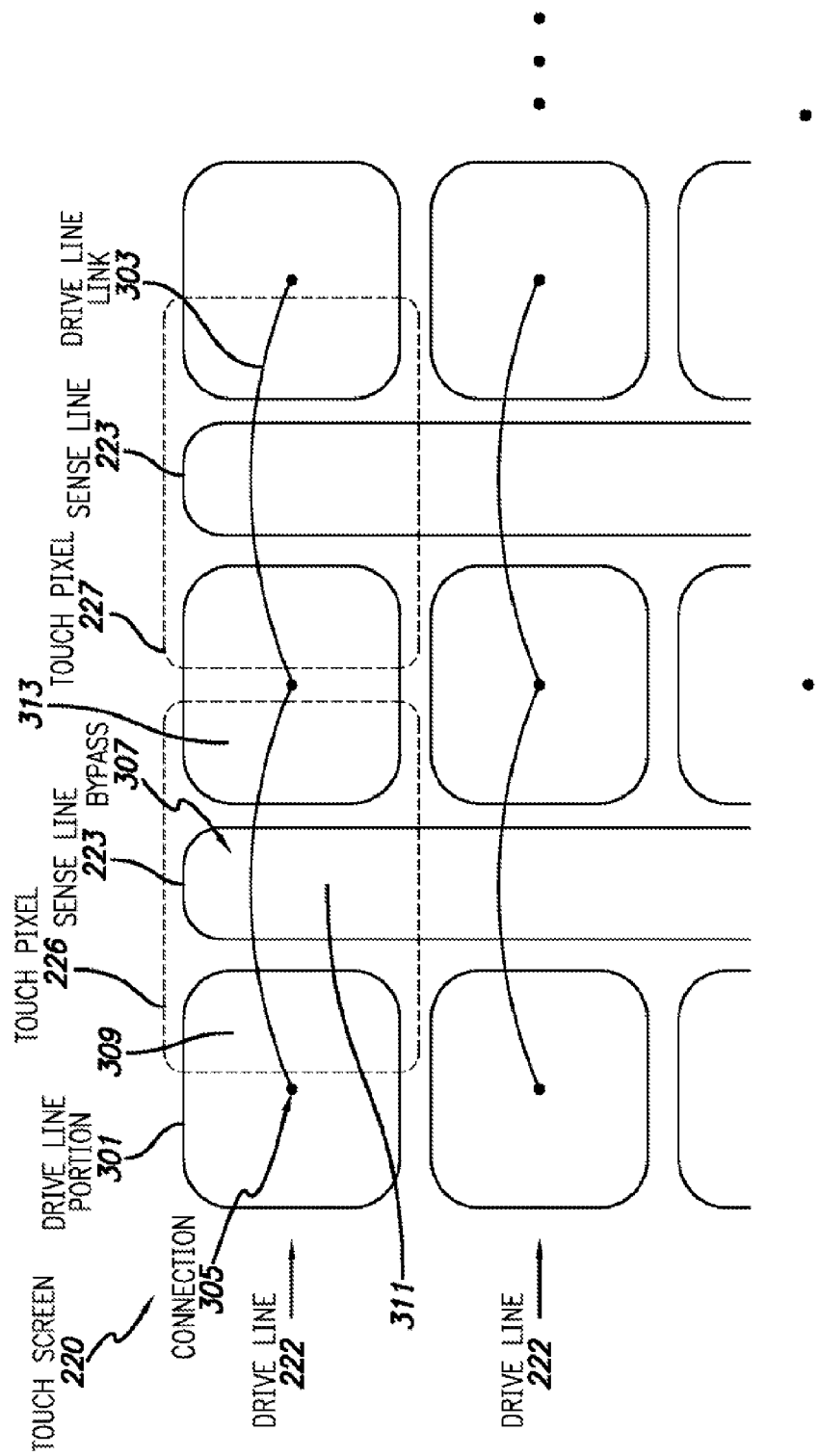
FIG. 3 is a more detailed view of the touch screen of FIG. 2 showing an example configuration of drive lines and sense lines according to embodiments of the disclosure.

In some example embodiments, touch screen 220 can be an integrated touch screen in which touch sensing circuit elements of the touch sensing system can be integrated into the display pixels stackups of a display. An example integrated touch screen in which embodiments of the disclosure can be implemented with now be described with reference to FIGS. 3-6. FIG. 3 is a more detailed view of touch screen 220 showing an example configuration of drive lines 222 and sense lines 223 according to embodiments of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

Figure 4:
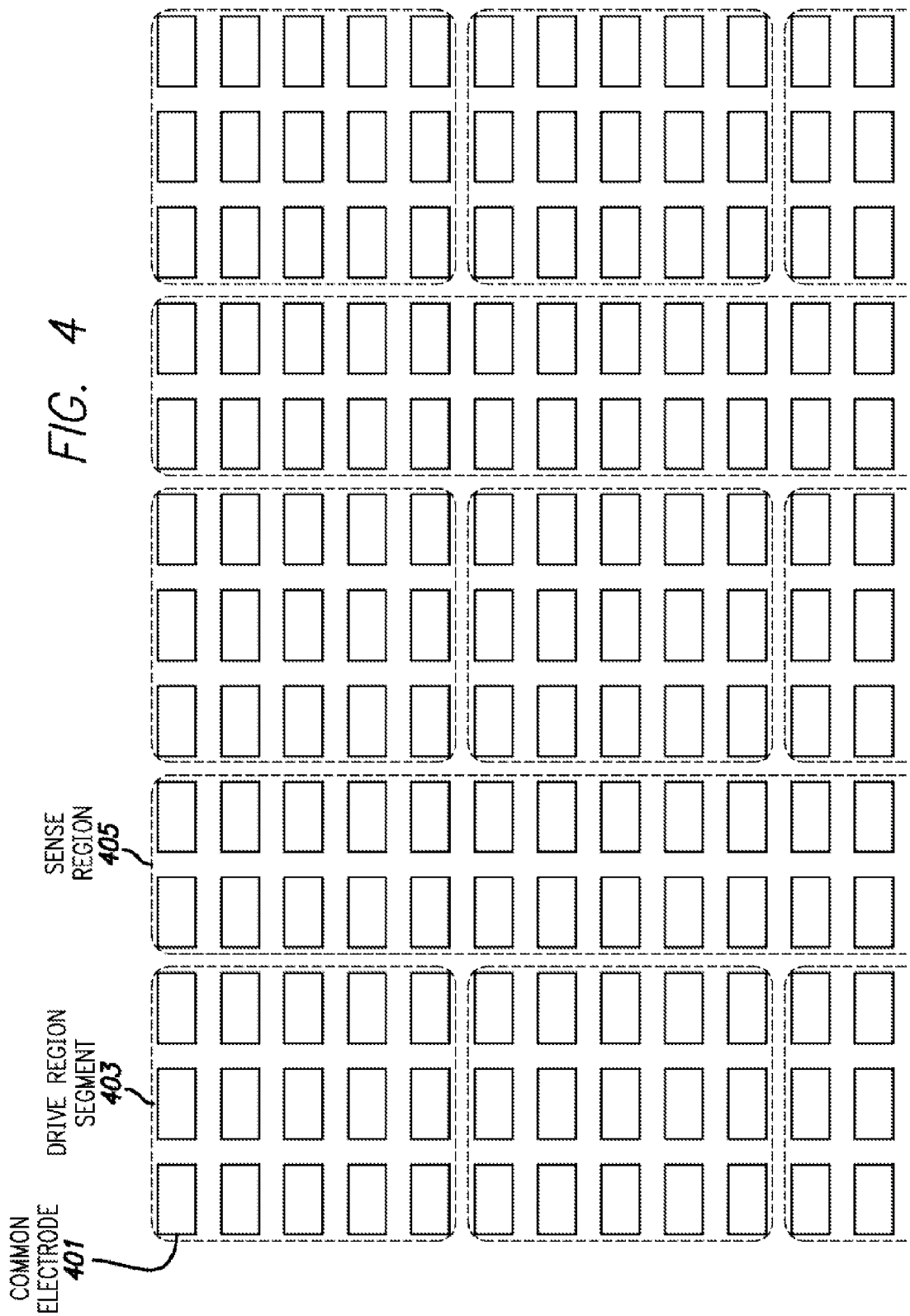
FIG. 4 illustrates an example configuration in which touch sensing circuitry includes common electrodes (Vcom) according to embodiments of the disclosure.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel includes a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

In addition, although example embodiments herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments, for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some embodiments, a touch pixel of the configuration of FIG. 4 can include, for example, a 64×64 area of display pixels. However, the drive and sense regions are not limited to the shapes, orientations, and positions shown, but can include any suitable configurations according to embodiments of the disclosure. It is to be understood that the display pixels used to form the touch pixels are not limited to those described above, but can be any suitable size or shape to permit touch capabilities according to embodiments of the disclosure.

Figure 5:
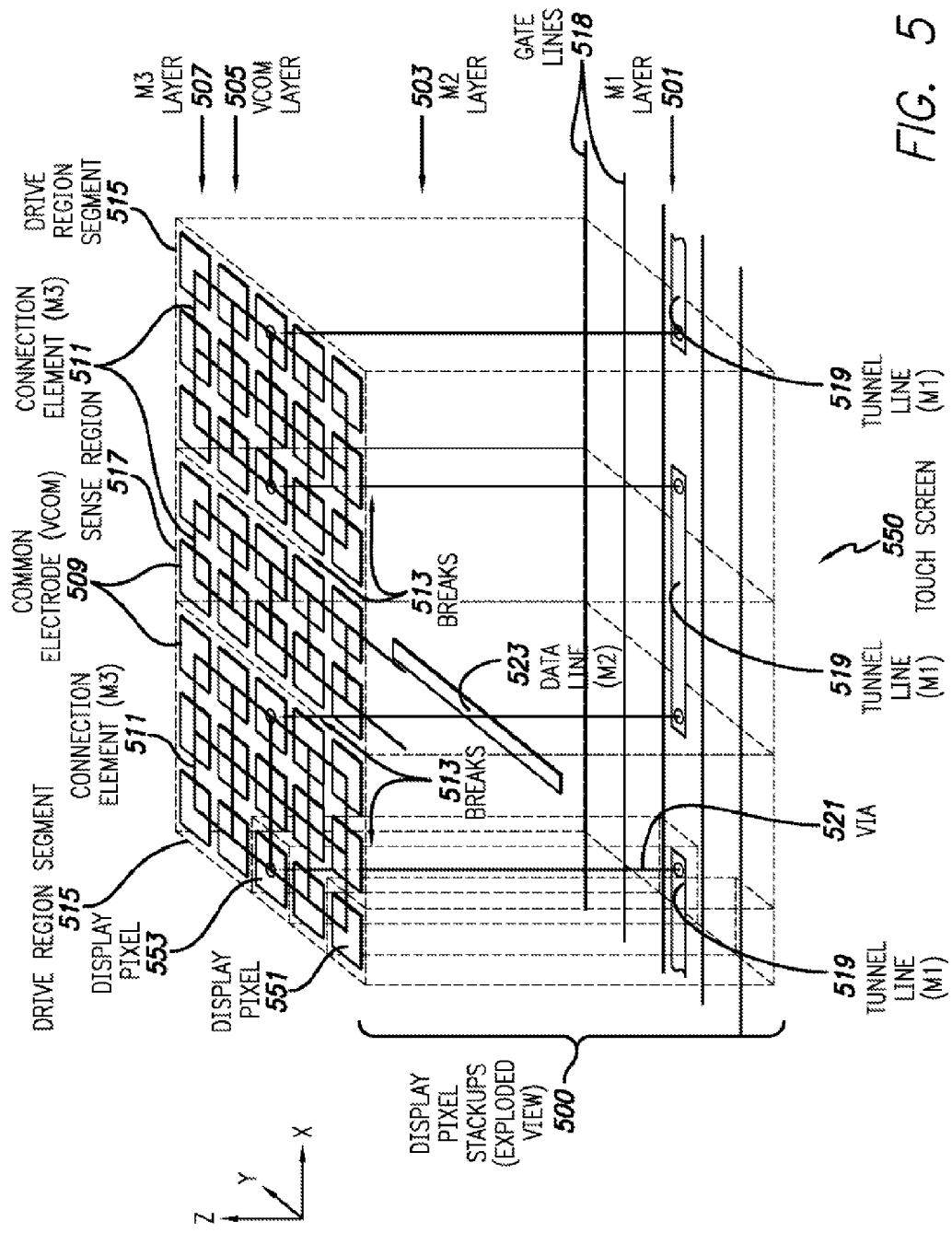
FIG. 5 illustrates an exploded view of display pixel stackups according to embodiments of the disclosure.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element 511 that can electrically connect together common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include gate lines 518. M1 layer 501 can include tunnel lines 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. M2 layer 503 can include data lines 523. Only one data line 523 is shown for the sake of clarity; however, a touch screen can include multiple data lines running through each vertical row of pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

A touch sensing operation according to embodiments of the disclosure will be described with reference to FIG. 6. FIG. 6 shows partial circuit diagrams of some of the touch sensing circuitry within display pixels in a drive region segment 601 and a sense region 603 of an example touch screen according to embodiments of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a gate line 612, a data line 614, a pixel electrode 616, and a common electrode 618. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

During a touch sensing phase, drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

FIG. 7 illustrates an example partial circuit diagram of one display pixel 700 according to various embodiments. Some of the circuit elements of display pixel 700 can include a transistor (TFT) 701, a gate line 703, a data line 705, a pixel electrode 707, and a Vcom 709. Vcom 709 can be electrically connected to an amplifier 711 through a resistance 713. When gate line 703 is opened, for example, during a scan of the touch screen display, a high voltage of the gate signal can be applied to TFT 701, turning the gate of the TFT to the on state. A data signal on data line 705 can apply a voltage to pixel electrode 707, which can correspond to an amount of luminance required of the pixel to display the current frame of an image. The voltage applied by the data signal can be applied across a pixel electrode-to-Vcom capacitance 715 to create an electric field through liquid crystal (not shown). The electric field can cause the liquid crystal of the pixel to allow a controlled amount of backlight to pass through, thereby generating the desired amount of luminance for the pixel. However, when the gate signal transitions from the high voltage to the low voltage, a kickback voltage can result across electrode 715. The kickback voltage can affect the luminance of the pixel, for example, by causing a decrease in the luminance from the desired luminance of the pixel. In some designs, a parasitic capacitance 717 can exist between gate line 703 and Vcom 709. For example, parasitic capacitance 717 can depend on the orientation and the amount of overlap between gate line 703 and Vcom 709 within the stack up of the display pixel. In some designs, the amount of kickback voltage, and therefore the effect on luminance, of each display pixel may be the same or similar. However, in some embodiments the kickback voltage may vary depending on the position of the display pixel in the touch screen layout.

FIG. 8 illustrates another view of example touch screen 550 according to various embodiments. In FIG. 5 the common electrodes 509 of sense region 517 can be connected together with connection element 511. Therefore, the Vcoms in each sense region 517 form an electrically connected together structure that is represented in FIG. 8 as vertical Vcom line 801 and vertical Vcom line 803. Vertical Vcom lines 801 and 803 can be electrically separated from each other. Vcoms 509 of drive region segments 515 can be connected together with connection elements 511. In addition, the connected together Vcoms in each drive region segment can be further connected together through tunnel lines 519 to form an electrically connected together structure represented in FIG. 8 as horizontal Vcom line 805. While vertical Vcom lines 801 and 1003 can be electrically separated from each other, the segments that make up horizontal Vcom line 1005 can be electrically connected together via tunnel lines 519.

Referring again to FIG. 7, parasitic capacitance 717 can depend on, for example, an amount of overlap of gate line 703 with Vcom 709. In the example in embodiment illustrated in FIG. 8, it can be seen that the amount of overlap between a gate line 518 and horizontal Vcom line 805 can be much greater than an amount of overlap between the gate line and vertical Vcom line 801, for example. In other words, the parasitic capacitance between a gate line and the Vcom in a pixel in drive region segment 515 can be much greater than the parasitic capacitance in a display pixel in a sense region 517 of touch screen 550. The difference in the parasitic capacitances of display pixels in the drive regions and in the sense regions can cause a difference in the effective kickback voltages in each of the regions. The difference in kickback voltages can result in, for example, a difference in the luminance of pixels in the drive regions and of pixels in the sense regions of touch screen 550.

FIG. 9 illustrates an example partial circuit diagram of two display pixels in an example touch screen 900 according to various embodiments. The two display pixels can be, for example, two display pixels in adjacent rows of drive region segment 515, two display pixels in adjacent rows of sense region 517, etc. A display pixel 901*a* can include a TFT 903*a*, a gate line 905*a*, a data line 907, a pixel electrode 909*a*, a Vcom 911*a*, a pixel electrode-to-Vcom capacitance 913*a*, a parasitic capacitance 915*a*, a resistance 917*a*, and an amplifier 919*a*. Likewise, display pixel 901*b* can include a TFT 903*b*, a gate line 905*b*, a data line 907, a pixel electrode 909*b*, a Vcom 911*b*, a pixel electrode-to-Vcom capacitance 913*b*, a parasitic capacitance 915*b*, a resistance 917*b*, and an amplifier 919*b*. For example, touch screen 900 can correspond to touch screen 550 of FIG. 5, and the various elements in FIG. 9, such as gate lines, data lines, pixel electrodes, etc., can correspond to the same elements in touch screen 550. Likewise, a connection element 921 of FIG. 9 can correspond to connection element 511 of FIG. 5. Connection element 921 can electrically connect together Vcom 911*a* and Vcom 911*b* of touch screen 900, such that Vcoms 911*a* and 911*b* can form a single conductive circuit element. In other words, display pixel 901*a* and display pixel 901*b* can be display pixels in adjacent rows of display pixels of an integrated touch screen that includes connected together Vcoms of display pixels to form drive region segments and sense regions such as those shown in FIG. 5.

Figure 10:
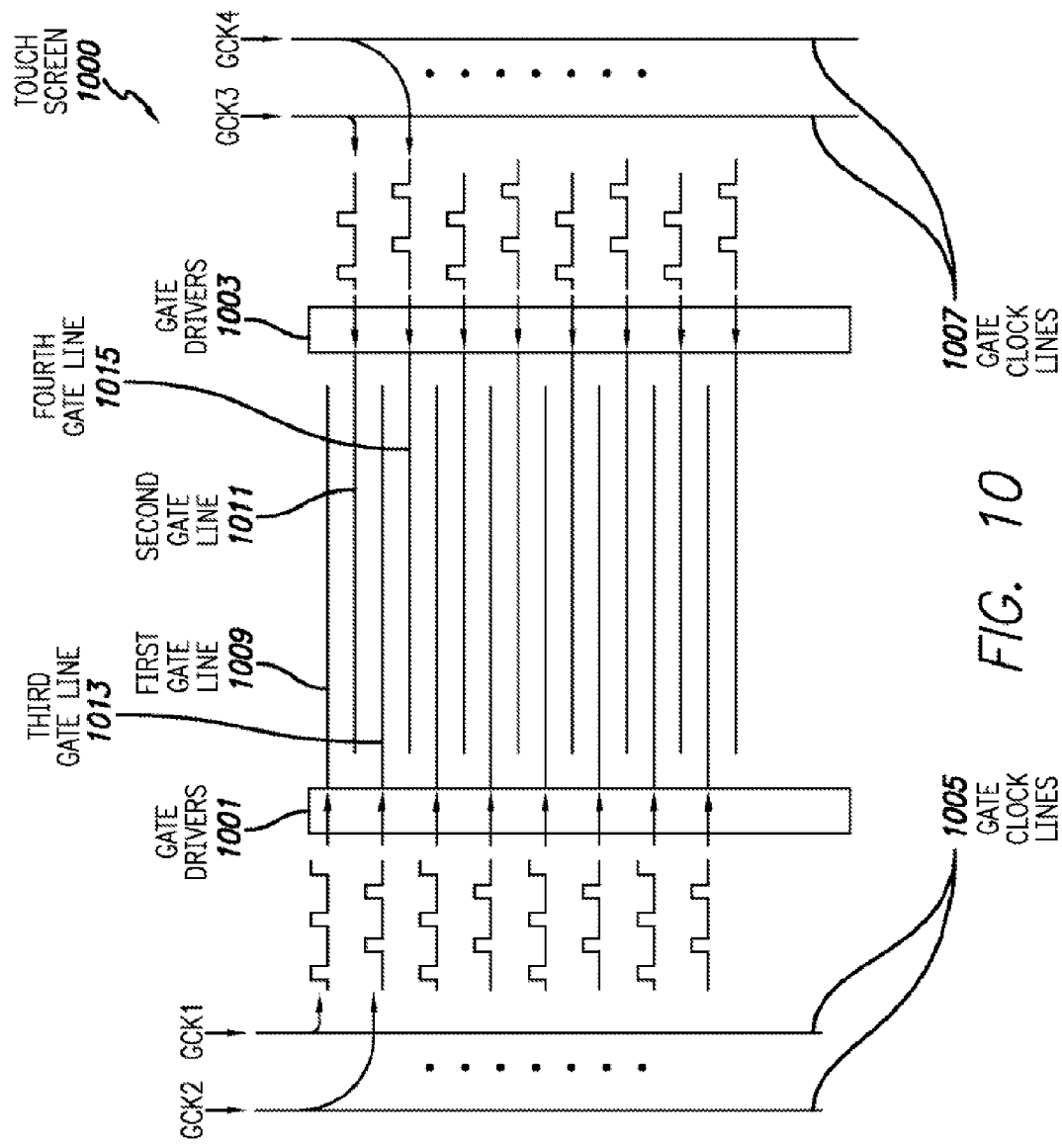
FIG. 10 illustrates an example double-sided gate driver configuration according to embodiments of the disclosure.

FIG. 10 illustrates an example configuration of gate drivers according to various embodiments in which a double-sided gate driver configuration can be used. FIG. 10 shows a touch screen 1000 including two sets of gate drivers, gate drivers 1001 and 1003, on either side of the active area of touch screen 1000. Gate drivers 1001 can receive gate clock signals GCK1 and GCK2 from gate clock lines 1005, and gate drivers 1003 can receive gate clock signals GCK3 and GCK4 from gate clock lines 1007. Gate drivers 1001 can apply GCK1 to a first gate line 1009 and can apply GCK2 to a third gate line 1013. Gate drivers 1003 can apply GCK3 to a second gate line 1011 and can apply GCK4 to a fourth gate line 1015.

Example systems and operations of separate controlling of slew rate and shunting capability in scanning systems will now be described in reference to FIGS. 11-15.

Figure 11:
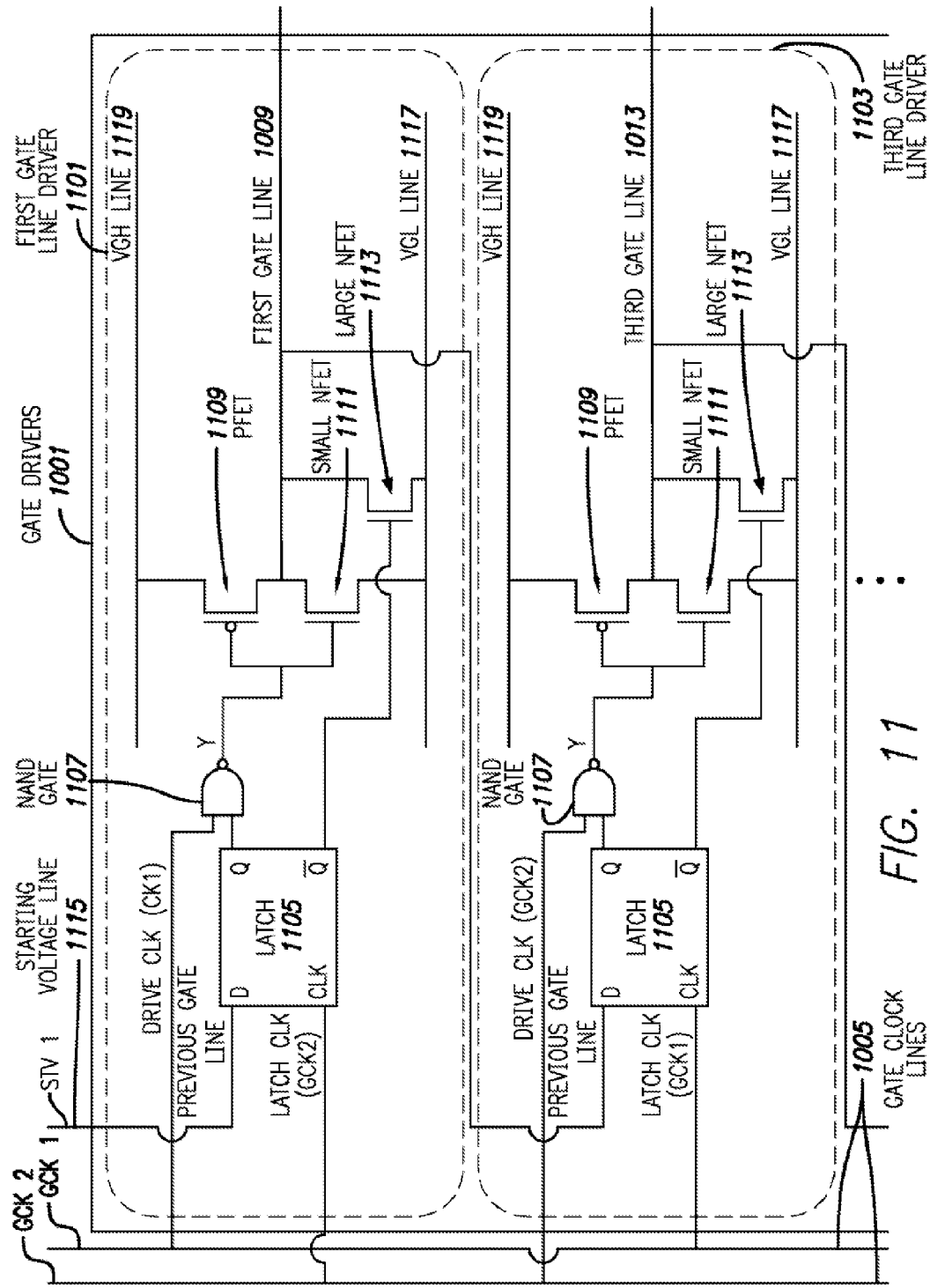
FIG. 11 illustrates example gate drivers according to embodiments of the disclosure.

FIG. 11 illustrates an example configuration of gate drivers 1001 according to various embodiments. Gate drivers 1001 can include a first gate line driver 1101 and a third gate line driver 1103, as well as additional gate line drivers for the other gate lines (not shown) driven from the left side of the touch screen. Each of gate line drivers 1101 and 1103 can include a latch 1105, a NAND gate 1107, a PFET 1109, a small NFET 1111, and a large NFET 1113. During operation, PFET 1109 can connect a high gate voltage (VGH) line 1119 to the gate line, such that the PFET can control a rising time of the gate line signal. Small NFET 1111 and large NFET 1113 can each connect the gate line to a low gate voltage (VGL) line 1117.

Therefore, each of small NFET 1111 and large NFET 1113 can provide a separate shunting resistance between the gate line and VGL line 1117. Small NFET 1111 can be designed to provide a shunting resistance greater than a predetermined amount that results in a sufficiently long falling time of the gate line signal. In some embodiments, for example, small NFET 1111 can be 10 micrometers in size. Large NFET 1113 can be designed to provide a shunting resistance less than a predetermined amount that results in a sufficiently low shunting resistance between the gate line and VGL line 1117. In some embodiments, for example, large NFET 1113 can be 50 micrometers in size. A starting voltage line 1115 can carry a starting voltage STV1 that can provide an initial input for latch 1105 of first gate line driver 1101, as described in more detail below. It should be understood that the memory elements, gates, transistor switches, and switches configured to provide shunting resistances shown in FIG. 11 are only examples, and that other circuit elements and configurations capable of performing similar functions can also be employed.

Figure 12:
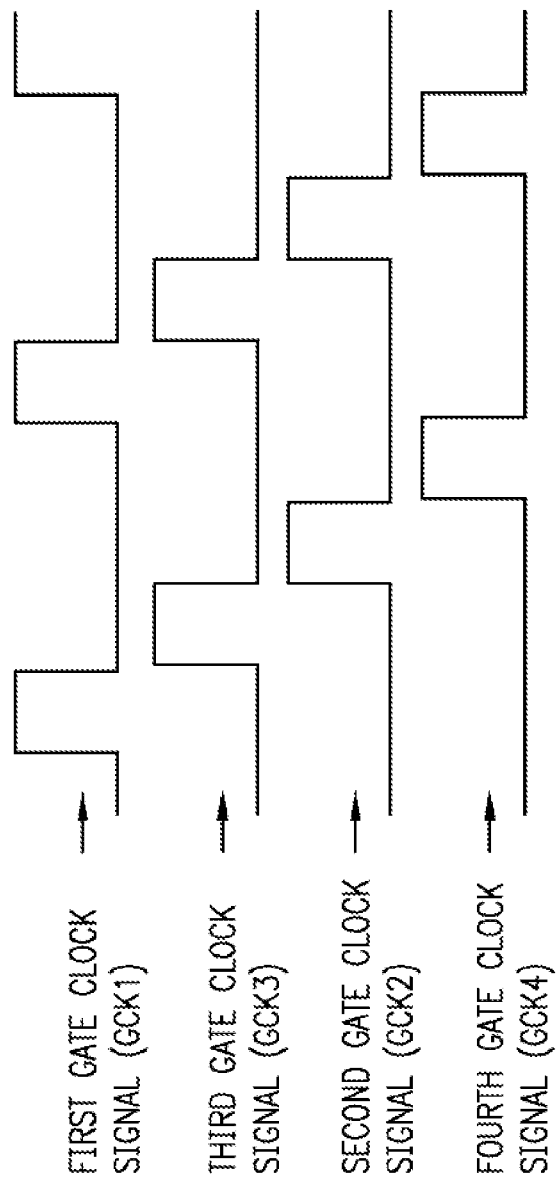
FIG. 12 illustrates example gate clock signals according to embodiments of the disclosure.

FIG. 12 illustrates an example set of gate clock signals including first, second, third and fourth gate clock signals, GCK1, GCK2, GCK3, GCK4, respectively. As shown in FIG. 10, gate signals based on gate clock signals GCK1 and GCK2 can be applied by gate drivers 1001 to first gate line 1009 and third gate line 1013 from the left side of the touch screen 1000, and gate signals based on GCK3 and GCK4 can be applied by gate drivers 1003 to second gate line 1011 and fourth gate line 1015 from the right side of the touch screen. As the gate lines are scanned sequentially from top to bottom, the order of the gate clock signals can be, for example, GCK1 from gate driver 1001, GCK3 from gate driver 1003, GCK2 from gate driver 1001, GCK4 from gate driver 1003, etc. This pattern can repeat for the remainder of the gate lines in the touch screen.

Table 1 illustrates an example state table of NAND gates 1107, as well as corresponding transistor states and gate line operations of first gate line driver 1101 and third gate line driver 1103 according to various embodiments.

TABLE 1

| NAND Gate Logic | | | Transistor State | | Gate Line Driver |
|---|---|---|---|---|---|
| Q | DriveClk | Y | Small PFET | Large NFET | Operation |
| 1 | 1 | 0 | ON | OFF | OFF | Rising |
| 1 | 0 | 1 | OFF | ON | OFF | High R Falling/High R Shunting |
| 0 | 1 | 1 | OFF | ON | ON | Low R Shunting |
| 0 | 0 | 1 | OFF | ON | ON | Low R Shunting |

Referring to Table 1 together with FIGS. 11-14, an example method of scanning the gate lines with gate drivers 1001 will now be described. One skilled in the art would understand that a corresponding method can be used to scan the gate lines driven by gate drivers 1003.

Figure 13:
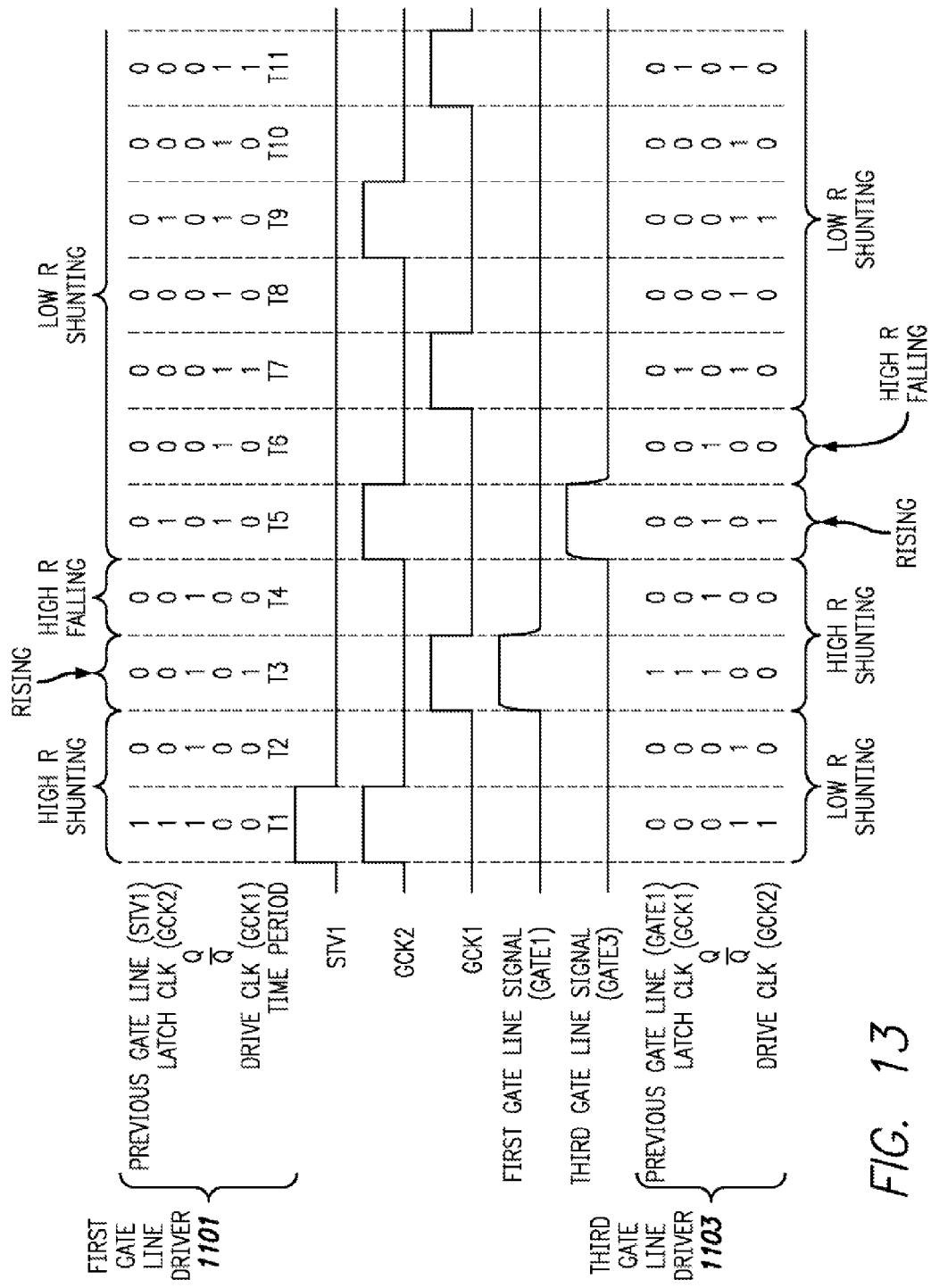
FIG. 13 illustrates an example method performing separate control of a falling time operation and a shunting operation according to embodiments of the disclosure.

Table 1 illustrates example gate line driver operations that can be performed when the transistors, PFET, small NFET, and large NFET are placed into particular combinations of states through the operation of the NAND gate logic. FIG. 13 illustrates an example timing of gate line driver operations according to the timing of various signals applied to latches 1105 and NAND gates 1107 according to various embodiments.

FIG. 13 shows example signals STV1, GCK2, GCK1, a first gate line signal (Gate 1), and a third gate line signal (Gate 3). FIG. 13 also shows latch 1105 values D (previous gate line), CLK (LatchClk), Q, and Qbar, and corresponding DriveClk values, corresponding to the values of the signals for the first gate line driver 1101 and the third gate line driver 1103 during multiple time periods, T1-T11.

Referring to Table 1 and FIG. 13, the example operation of first gate line driver 1101 will now be described. In time periods T1-T2, first gate line driver 1101 can perform a high resistance (R) shunting operation in which a high level signal of STV1 is latched to set the value of Q to equal 1, and DriveClk (which is GCK1 for the first gate line driver) remains at a low level signal. In other words, during the high R shunting operation, the first gate line signal can be low, small NFET 1111 be on and can connect first gate line 1009 to VGL line 1117, and PFET 1109 and large NFET 1113 can be in the off state. In T3, GCK1 can go to a high level, which switches on the PFET 1109 of first gate line driver 1101 and connects VGH line 1119 to the first gate line 1009. Thus, PFET 1109 can control the rising time of the first gate line signal in T3. In T4, GCK1 can go to a low level, which switch off PFET 1109 and switches on small NFET 1111, resulting in a high R falling operation. In other words, during the high R falling operation PFET 1109 and large NFET 1113 can be off, and small NFET 1111 can connect first gate line 1009 (which is at a high level) to VGL line 1117, thus providing a high resistance shunt to allow a sufficiently long falling time.

In T5, GCK2 can go to high level while STV1 can be at a low level. Thus, GCK2 can latch the low level of STV1, which can set the value of Q to zero and turn on large NFET 1113 (which is controlled by Qbar). Therefore, for the remaining time periods, T5-T11 (and subsequent time periods remaining in the current scan of the display, which are not shown), both small NFET 1111 and large NFET 1113 can connect, in parallel, first gate line 1009 to VGL 1117. Large NFET 1113 can provide a low resistance and, in parallel with the resistance of small NFET 1111, can provide a low resistance shunting operation to shunt the first gate line to the VGL line.

The example operation of third gate line driver 1103 will now be described. In time periods T1-T2, the value of Q can be zero, and Qbar can have a value of 1. Therefore, third gate driver 1103 can perform a low R shunting operation during T1-T2. In T3-T4, third gate line driver 1103 can perform a high R shunting operation in which a high level signal of the first gate line signal during T3 is latched to set the value of Q to equal 1, and DriveClk (which is GCK2 for the third gate line driver) remains at a low level signal. In T5, GCK2 can go to a high level, which switches on the PFET 1109 of third gate line driver 1103 and connects VGH line 1119 to the third gate line 1013. Thus, PFET 1109 can control the rising time of the third gate line signal in T5. In T6, GCK2 can go to a low level, which can switch off PFET 1109 and can switch on small NFET 1111, resulting in a high R falling operation. In T7, GCK1 can go to high level while the first gate line signal can be at a low level. Thus, GCK1 can latch the low level of the first gate line signal, which can set the value of Q to zero and turn on large NFET 1113. Therefore, for the remaining time periods, T7-T11 (and subsequent time periods remaining in the current scan of the display, which are not shown), both small NFET 1111 and large NFET 1113 can connect, in parallel, third gate line 1013 to VGL 1117. Large NFET 1113 can provide a low resistance and, in parallel with the resistance of small NFET 1111, can provide a low resistance shunting operation to shunt the third gate line to the VGL line.

Figure 14:
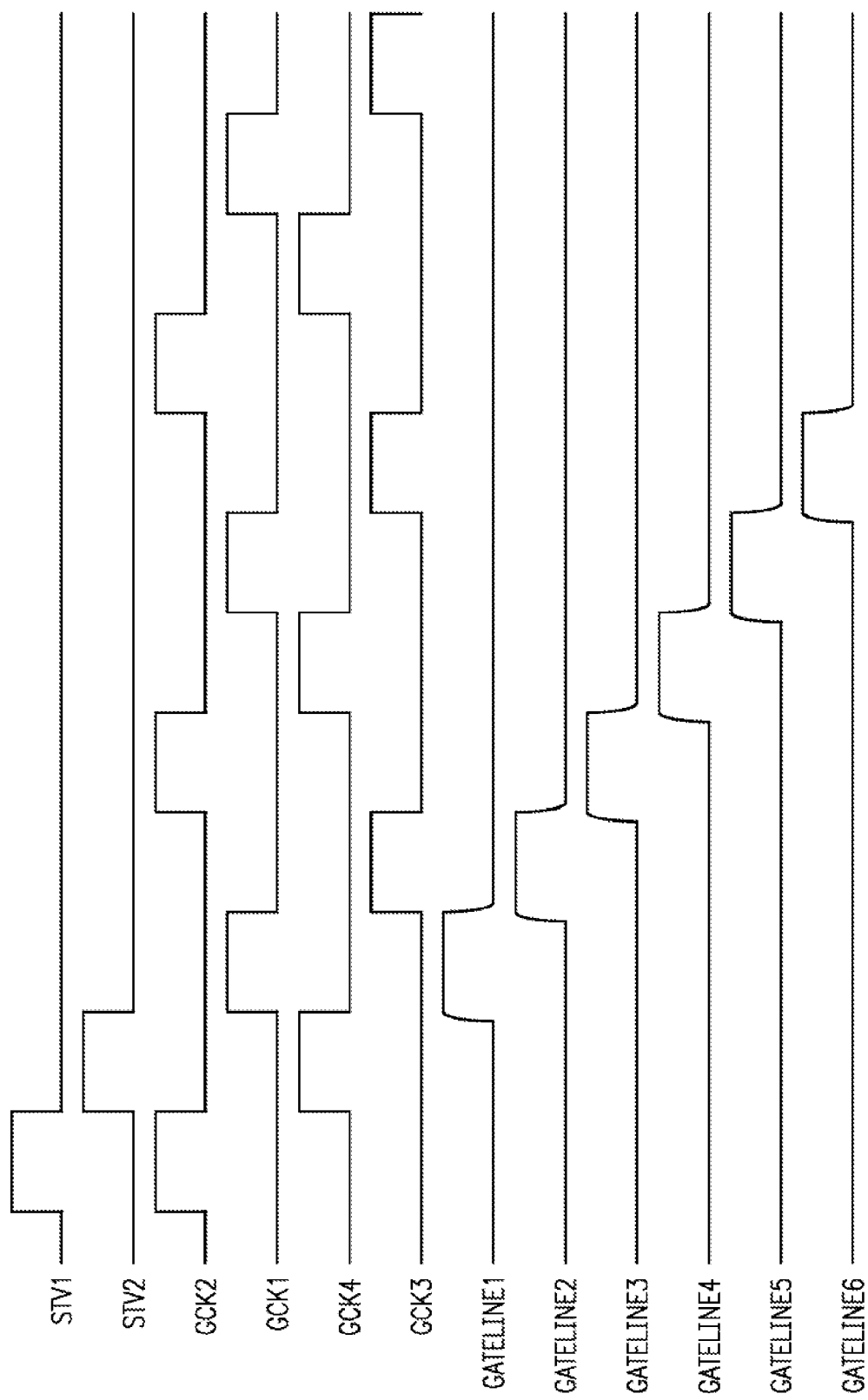
FIG. 14 illustrates example signals of an example gate line system according to embodiments of the disclosure.

The structures and operations of gate drivers 1003 (on the right side of touch screen 1000 as shown in FIG. 10) can be similar to those described for first gate line driver 1101 and third gate line driver 1103, as one skilled in the art would understand. FIG. 14 illustrates an example set of start signals (STV1 and STV2), gate clock signals (GCK1, GCK2, GCK3, and GCK4), and corresponding gate line signals (Gate1-Gate6) for the first six gate lines of an example touch screen such as touch screen 1000. In this example embodiment, scanning the gate lines from two sides of the touch screen can conveniently allow the low R shunting operation of a gate line driver to begin a period of time after the high R falling operation begins. In the example shown in FIG. 13, for example, the low R shunting operation can begin one time period after the high R falling operation begins. This can conveniently provide a time period during which a slow falling time can occur. In this way, for example, the control of the shunting operation can begin after the gate line signal has reached a steady state.

Figure 15:
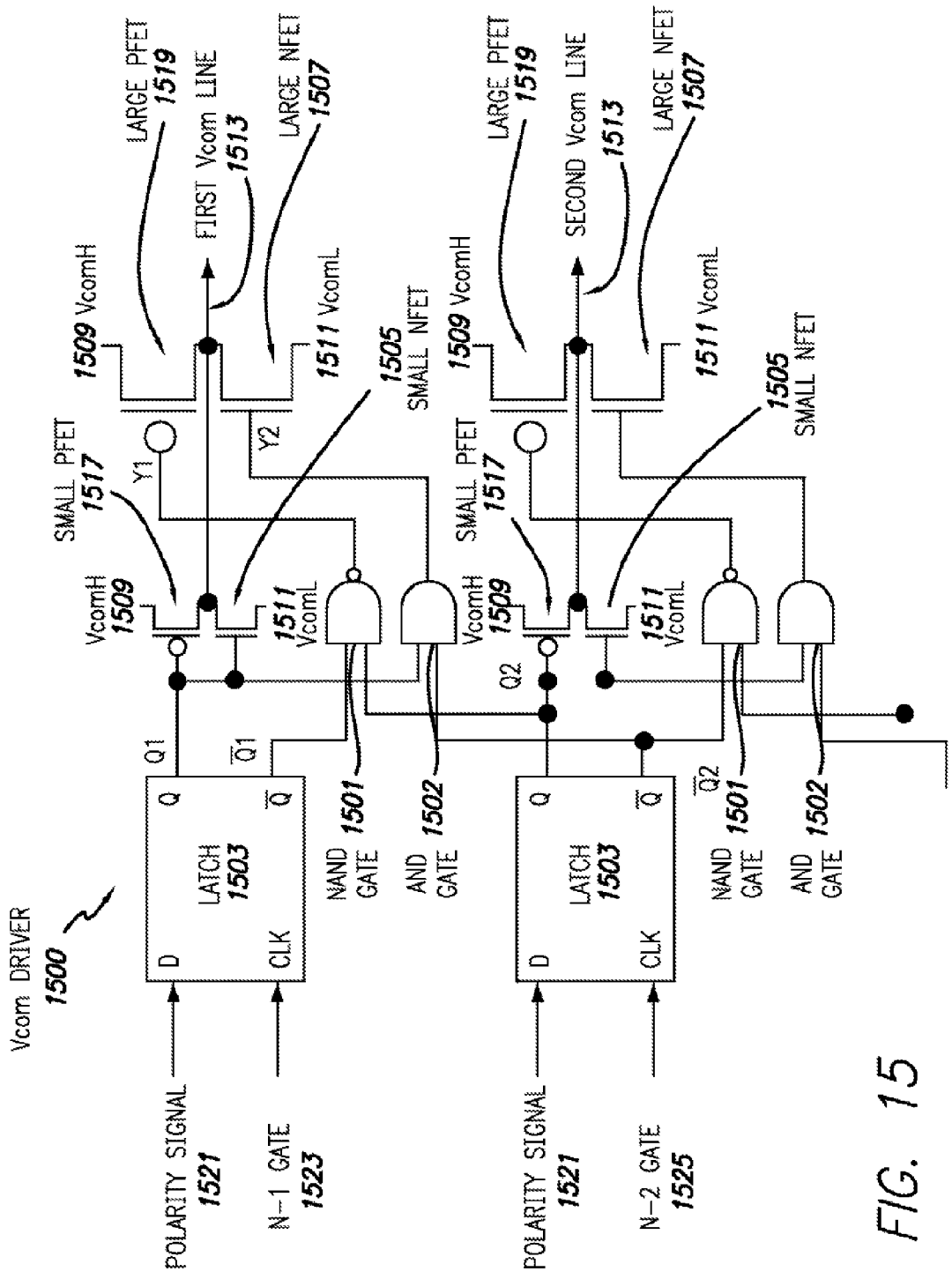
FIG. 15 illustrates an example Vcom driver system according to embodiments of the disclosure.

FIG. 15 illustrates a portion of an example Vcom driver 1500 according to various embodiments. The portion of Vcom driver 1500 includes NAND gates 1501, AND gates 1502, latches 1503, small NFETs 1505, large NFETs 1507, high level Vcom voltage lines (VcomH) 1509, low level Vcom voltage lines (VcomL) 1511, a first Vcom line 1513, and a second Vcom line 1515. Vcom driver 1500 can include polarity signal lines 1521, N-1 lines 1523, and N-2 lines 1525.

Figure 16:
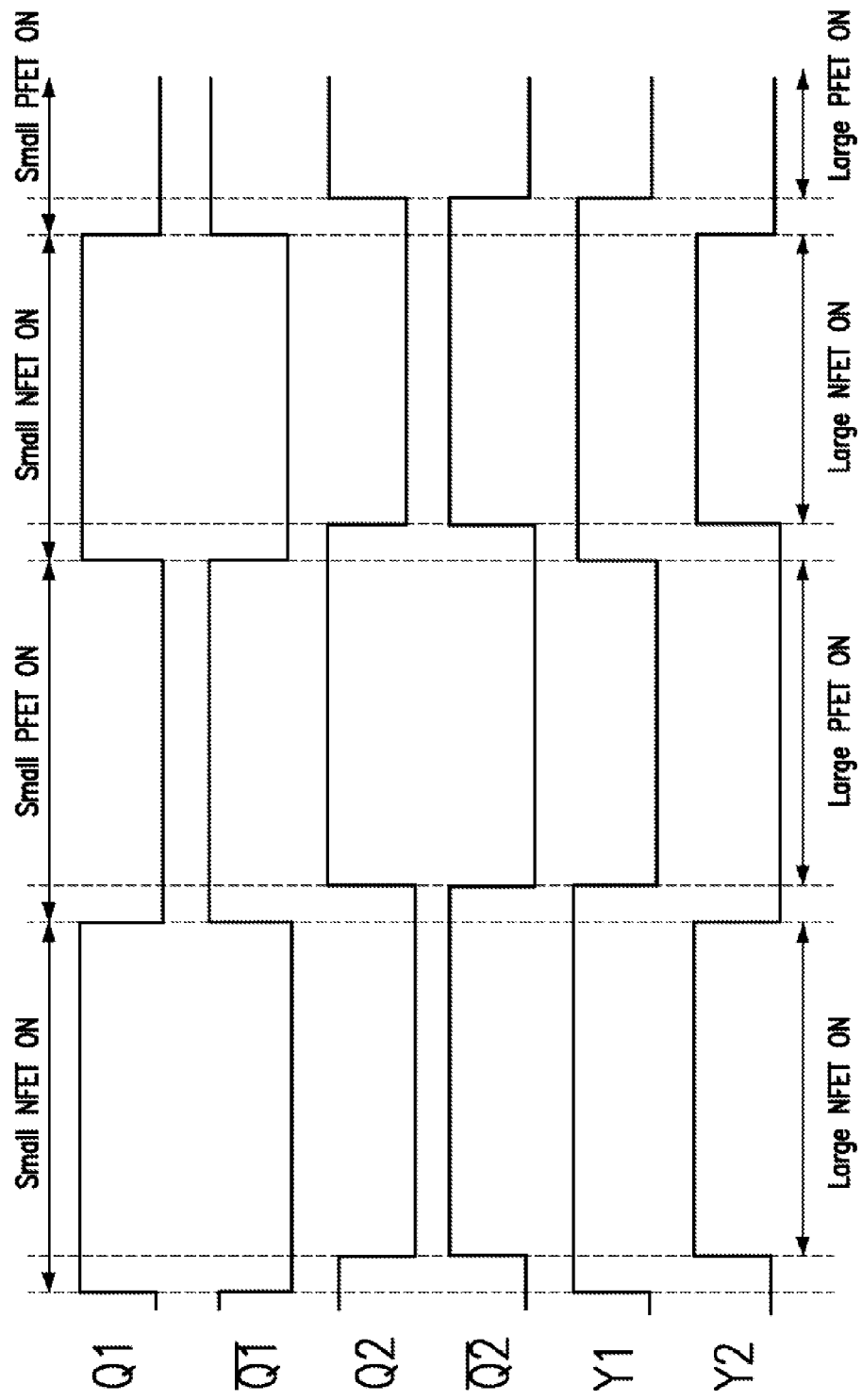
FIG. 16 illustrates an example timing of signals of a Vcom driver system of FIG. 15 according to embodiments of the disclosure.

Vcom driver 1500 also includes small PFETs 1517 and large PFETs 1519. Small PFETs 1517, large PFETs 1519, small NFETs 1509, and large NFETs 1507 can be controlled by latches 1503 and the NAND and AND gates as shown in the example timing diagram shown in FIG. 16. For example, FIG. 16 illustrates that a high value of Q can switch the small NFET on, and a low value of Q can switch the small PFETs on. A low value of Qbar can switch on large NFET, and a high value of Qbar can switch on large PFET. It should be understood that the memory elements, gates, transistor switches, and switches configured to provide shunting resistances shown in FIG. 15 are only examples, and that other circuit elements and configurations capable of performing similar functions can also be employed.

As one skilled in the art would understand, other types of transistors and/or other configurations can be used to provide separate slew rate and shunting operations. For example, some embodiments can provide separate control of rising times and shunting capability. In some embodiments, a slew rate can be controlled by a low resistance transistor, such that the slew rate is high, and the shunting operation can be controlled by switching on a high resistance transistor and switching off the low R transistor to provide a high shunting capability.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

In this example embodiment, each sub-pixels can be a red (R), green (G) or blue (B) sub-pixel, with the combination of all three R, G and B sub-pixels forming one color display pixel. Although this example embodiment includes red, green, and blue sub-pixels, a sub-pixel may be based on other colors of light or other wavelengths of electromagnetic radiation (e.g., infrared) or may be based on a monochromatic configuration.

A scanning system is disclosed. In some examples, the scanning system can comprise: a first gate line driver including: a first scan line, a first voltage line and a second voltage line, a first p-type transistor coupled to the first voltage line and the first scan line, the p-type transistor configured to control a rise time of the first scan line, a first n-type transistor coupled to the second voltage line and the first scan line, the first n-type transistor configured to control a fall time of the first scan line by providing a first shunting resistance greater than a predetermined amount, and a second n-type transistor coupled to the second voltage line and the first scan line, the second n-type transistor configured to provide a second shunting resistance less than the predetermined amount, wherein the first and second n-type transistors are both configured to be on when the second n-type transistor provides the second shunting resistance.

Additionally or alternatively, in some examples, a gate of the p-type transistor is directly coupled to the gate of the first n-type transistor. Additionally or alternatively, in some examples, each scan line includes a first time period, a second time period, and a third time period, the first time period configured for activating the p-type transistor, the second time period configured for activating the first n-type transistor, and the third time period configured for activating both the first n-type transistor and the second n-type transistor. Additionally or alternatively, in some examples, the third time period begins one clock period after the second time period begins. Additionally or alternatively, in some examples, the first n-type transistor is configured with a size of 10 um. Additionally or alternatively, in some examples, the second n-type transistor is configured with a size of 50 um. Additionally or alternatively, in some examples, the ratio of a size of the second n-type transistor to a size of the first n-type transistor is 5. Additionally or alternatively, in some examples, the scanning system is included in a touch screen, the touch screen comprising: a plurality of sense regions including a plurality of first common electrodes; a plurality of drive regions including a plurality of second common electrodes, wherein a parasitic capacitance between the plurality of second common electrodes and the scan line is different than a parasitic capacitance between the plurality of first common electrodes and the scan line. Additionally or alternatively, in some examples, an overlap between the plurality of first common electrodes and a plurality of scan lines is less than an overlap between the plurality of second common electrodes and the plurality of scan lines, and wherein the plurality of scan lines includes the scan line. Additionally or alternatively, in some examples, the scanning system further comprises: a second gate line driver including: a second scan line, a second p-type transistor coupled to the first voltage line and the first scan line, the p-type transistor configured to control a rise time of the second scan line, a third n-type transistor coupled to the second voltage line and the second scan line, the third n-type transistor configured to control a fall time of the second scan line by providing the first shunting resistance, and a fourth n-type transistor coupled to the second voltage line and the second scan line, the fourth n-type transistor configured to provide the second shunting resistance. Additionally or alternatively, in some examples, the first gate line driver further comprises a first latch configured to receive a third scan line and a first clock signal, one or more outputs of the first latch coupled to one or more gates of the p-type transistor, first n-type transistor, and second n-type transistor. Additionally or alternatively, in some examples, the second gate line driver further comprises a second latch configured to receive the first scan line and a second clock signal, and wherein one or more outputs of the second latch are coupled to one or more gates of the p-type transistor, first n-type transistor, and second n-type transistor.

A method of scanning a plurality of scan lines included a scanning system is disclosed. In some examples, the method comprises: receiving a first voltage line; connecting a scan line to a first voltage line through a first n-type transistor, in response to the first voltage line; receiving a previous scan line and a first clock signal; connecting the scan line to a second voltage line through a p-type transistor in response to the previous scan line and a rise of the first clock signal, the p-type transistor configured to control a rise time of the scan line; connecting the scan line to the first voltage line through a first n-type transistor in response to the previous scan line and a fall of the first clock signal, the first n-type transistor configured to control a fall time of the scan line; and connecting the scan line to the first voltage line through both the first n-type transistor and a second n-type transistor. Additionally or alternatively, in some examples, the method further comprises: receiving a second clock signal; connecting the scan line to the first voltage line through a second n-type transistor in response to a rise of the second clock signal, the second n-type transistor configured to provide a shunting resistance less than a predetermined amount. Additionally or alternatively, in some examples, the scan line is coupled to the first voltage line through the first n-type transistor at a same time as the scan line is coupled to the first voltage line through the second n-type transistor. Additionally or alternatively, in some examples, the method further comprising disconnecting the scan line from the first voltage line when the scan line is connected to the second voltage line. A system for driving one or more common electrode lines is disclosed. In some examples, the system comprises: a first p-type transistor and a second p-type transistor, wherein a size of the second p-type transistor is larger than a size of the first p-type transistor; and a first n-type transistor and a second n-type transistor, wherein a size of the second n-type transistor is larger than a size of the first n-type transistor. Additionally or alternatively, in some examples, the first p-type transistor and second p-type transistor are configured for coupling a first common electrode line to a first voltage source. Additionally or alternatively, in some examples, the first p-type transistor couples the first common electrode line to the first voltage source for a time period shorter than the second p-type transistor couples the first common electrode line to the first voltage source. Additionally or alternatively, in some examples, the first n-type transistor and the second n-type transistor are configured for coupling a second common electrode line to a second voltage source.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:
1. A scanning system comprising:
 a first gate line driver including:
  a first scan line,
  a first voltage line and a second voltage line,
  a first p-type transistor coupled to the first voltage line and the first scan line, the p-type transistor configured to control a rise time of the first scan line,
  a first n-type transistor coupled to the second voltage line and the first scan line, the first n-type transistor configured to control a fall time of the first scan line by providing a first shunting resistance greater than a predetermined amount, and
  a second n-type transistor coupled to the second voltage line and the first scan line, the second n-type transistor configured to provide a second shunting resistance less than the predetermined amount, wherein the first and second n-type transistors are both configured to be on when the second n-type transistor provides the second shunting resistance.

2. The scanning system of claim 1, wherein a gate of the p-type transistor is directly coupled to the gate of the first n-type transistor.

3. The scanning system of claim 1, wherein each scan line includes a first time period, a second time period, and a third time period,
the first time period configured for activating the p-type transistor,
the second time period configured for activating the first n-type transistor, and
the third time period configured for activating both the first n-type transistor and the second n-type transistor.

4. The scanning system of claim 3, wherein the third time period begins one clock period after the second time period begins.

5. The scanning system of claim 1, wherein the first n-type transistor is configured with a size of 10 um.

6. The scanning system of claim 1, wherein the second n-type transistor is configured with a size of 50 um.

7. The scanning system of claim 1, wherein the ratio of a size of the second n-type transistor to a size of the first n-type transistor is 5.

8. The scanning system of claim 1, wherein the scanning system is included in a touch screen, the touch screen comprising:
a plurality of sense regions including a plurality of first common electrodes;
a plurality of drive regions including a plurality of second common electrodes, wherein a parasitic capacitance between the plurality of second common electrodes and the scan line is different than a parasitic capacitance between the plurality of first common electrodes and the scan line.

9. The scanning system of claim 8, wherein an overlap between the plurality of first common electrodes and a plurality of scan lines is less than an overlap between the plurality of second common electrodes and the plurality of scan lines, and wherein the plurality of scan lines includes the scan line.

10. The scanning system of claim 1, further comprising:
a second gate line driver including:
a second scan line,
a second p-type transistor coupled to the first voltage line and the first scan line, the p-type transistor configured to control a rise time of the second scan line,
a third n-type transistor coupled to the second voltage line and the second scan line, the third n-type transistor configured to control a fall time of the second scan line by providing the first shunting resistance, and
a fourth n-type transistor coupled to the second voltage line and the second scan line, the fourth n-type transistor configured to provide the second shunting resistance.

11. The scanning system of claim 10, wherein the first gate line driver further comprises a first latch configured to receive a third scan line and a first clock signal, one or more outputs of the first latch coupled to one or more gates of the p-type transistor, first n-type transistor, and second n-type transistor.

12. The scanning system of claim 11, wherein the second gate line driver further comprises a second latch configured to receive the first scan line and a second clock signal, and wherein one or more outputs of the second latch are coupled to one or more gates of the p-type transistor, first n-type transistor, and second n-type transistor.

13. A method of scanning a plurality of scan lines included a scanning system, the method comprising:
receiving a first voltage line;
connecting a scan line to a first voltage line through a first n-type transistor, in response to the first voltage line;
receiving a previous scan line and a first clock signal;
connecting the scan line to a second voltage line through a p-type transistor in response to the previous scan line and a rise of the first clock signal, the p-type transistor configured to control a rise time of the scan line;
connecting the scan line to the first voltage line through a first n-type transistor in response to the previous scan line and a fall of the first clock signal, the first n-type transistor configured to control a fall time of the scan line; and
connecting the scan line to the first voltage line through both the first n-type transistor and a second n-type transistor.

14. The method of claim 13, further comprising:
receiving a second clock signal;
connecting the scan line to the first voltage line through a second n-type transistor in response to a rise of the second clock signal, the second n-type transistor configured to provide a shunting resistance less than a predetermined amount.

15. The method of claim 14, wherein the scan line is coupled to the first voltage line through the first n-type transistor at a same time as the scan line is coupled to the first voltage line through the second n-type transistor.

16. The method of claim 13, further comprising disconnecting the scan line from the first voltage line when the scan line is connected to the second voltage line.

17. A system for driving one or more common electrode lines, the system comprising:
a first p-type transistor and a second p-type transistor, wherein a size of the second p-type transistor is larger than a size of the first p-type transistor; and
a first n-type transistor and a second n-type transistor, wherein a size of the second n-type transistor is larger than a size of the first n-type transistor.

18. The system of claim 17, wherein the first p-type transistor and second p-type transistor are configured for coupling a first common electrode line to a first voltage source.

19. The system of claim 18, wherein the first p-type transistor couples the first common electrode line to the first voltage source for a time period shorter than the second p-type transistor couples the first common electrode line to the first voltage source.

20. The system of claim 17, wherein the first n-type transistor and the second n-type transistor are configured for coupling a second common electrode line to a second voltage source.

* * * * *